United States Patent [19]

Sayre

[11] Patent Number: 5,050,240
[45] Date of Patent: Sep. 24, 1991

[54] AIR CUSHION HELMET SUPPORT AND VENTILATION SYSTEM WITH AIR PRESSURE REGULATOR

[75] Inventor: James L. Sayre, San Jose, Calif.

[73] Assignee: Kaiser Aerospace and Electronics Corporation, Oakland, Calif.

[21] Appl. No.: 523,449

[22] Filed: May 14, 1990

[51] Int. Cl.⁵ ............................................. A42B 3/12
[52] U.S. Cl. .................................... 2/6; 2/2.1 A; 2/413; 2/421; 2/171.3; 2/410; 137/38; 137/505.17
[58] Field of Search ............... 2/2.1 A, 6, 410, 411, 2/413, 421, 422, 171.3; 137/505.17, 38, 39

[56] References Cited

U.S. PATENT DOCUMENTS

| | | | |
|---|---|---|---|
| 1,518,353 | 12/1924 | Ralston | 137/505.17 |
| 1,914,776 | 6/1933 | Hunt | 137/505.17 |
| 2,302,990 | 11/1942 | Ey | 137/505.17 |
| 2,335,475 | 11/1943 | Beall | 2/2.1 A |
| 2,390,233 | 12/1945 | Akerman et al. | 2/2.1 A |
| 2,617,408 | 11/1952 | Clark et al. | 137/39 |
| 2,620,791 | 12/1952 | Versoy et al. | 137/39 |
| 2,882,896 | 4/1959 | Seeler | 128/201.24 |
| 2,935,985 | 5/1960 | Andrews et al. | 2/6 |
| 2,952,264 | 9/1960 | Burns | 137/39 |
| 2,966,916 | 1/1961 | Cummins | 137/39 |
| 2,970,593 | 2/1961 | Seeler | 2/6 |
| 3,042,926 | 7/1962 | Shepard | 2/2.1 A |
| 3,044,464 | 7/1962 | Gray | 2/6 |
| 3,106,203 | 10/1963 | Mayo et al. | 137/38 |
| 3,157,885 | 11/1964 | Lobelle | 2/2.1 A |
| 3,430,642 | 3/1969 | Mack | 137/39 |
| 3,438,060 | 4/1969 | Lobelle et al. | 2/6 |
| 3,523,301 | 8/1970 | Davis et al. | 2/2.1 A |
| 3,566,409 | 3/1971 | Hopper | 2/171.3 |
| 3,578,006 | 5/1971 | Betz, Jr. | 137/38 |
| 3,963,021 | 6/1976 | Bancroft | 2/2.1 A |
| 4,035,846 | 7/1977 | Jencks | 2/6 |
| 4,095,289 | 6/1978 | Kissen et al. | 2/171.3 |
| 4,133,308 | 1/1979 | Lowe et al. | 2/171.3 |
| 4,136,688 | 1/1979 | Gorman | 2/171.3 |
| 4,227,520 | 10/1980 | Lord | 128/201.24 |
| 4,230,097 | 10/1980 | Beaussant et al. | 137/38 |
| 4,266,301 | 5/1981 | Canda | 2/171.3 |
| 4,455,687 | 6/1984 | Johansson | 2/171.3 |

FOREIGN PATENT DOCUMENTS

| | | | |
|---|---|---|---|
| 497887 | 12/1919 | France | 137/505.17 |
| 1113432 | 3/1956 | France | 2/6 |
| 2109042 | 5/1972 | France | 2/410 |
| 694997 | 1/1983 | U.S.S.R. | 2/413 |

Primary Examiner—Werner H. Schroeder
Assistant Examiner—Michael A. Neas

[57] ABSTRACT

An air cushioned safety and/or display helmet. A thin cushion of air between the wearer's head and the inside of the helmet supports the helmet and distributes the helmet's weight evenly thus preventing development of pressure points and corresponding wearer fatigue. When used in a high performance environment which exposes the user to g forces, such as fighter aircraft, an air regulator controls the air pressure of the air cushion in response to these forces to maintain helmet position and comfort. Air contained in the air cushion can also be used to demist the helmet visor and display optics, can be directed past the head to provide heating or cooling of the head, or can do both at one time.

24 Claims, 3 Drawing Sheets

AIR CUSHION HELMET SUPPORT AND VENTILATION SYSTEM WITH AIR PRESSURE REGULATOR

BACKGROUND OF THE INVENTION

Persons flying military aircraft are frequently outfitted with a helmet. The typical helmet weighs approximately four pounds and rests directly on the wearer's head via a foam liner. This helmet/head interface has several disadvantages which compromise the safety and effectiveness of flight personnel.

One disadvantage of the typical helmet, is that pressure points develop at those places where the helmet liner rests upon the wearer's head. These pressure points can make the helmet uncomfortable after only limited periods of use. This source of discomfort has human factors consequences which degrade the performance of flight personnel and contribute to fatigue. Flight crew fatigue negatively influences mission effectiveness and safety.

Another disadvantage of the typical helmet is its performance during high g maneuvers of the aircraft. During such maneuvers, the helmet moves relative to the wearer's head. During a positive g force loading, the helmet is pressed down on the wearer's head thus increasing discomfort due to the additional force exerted on the wearer's head at the pressure points. During negative g force loading, the helmet moves away from the head, and an undesirable degree of tension is created on the helmet chin or jaw strap. This tension is uncomfortable for the wearer.

G force loading moves the helmet in relation to the head, such motion of the helmet causing interference with flight crew vision. Typical helmets are fitted with a visor. As the helmet moves relative to the head, the visor shifts position. This movement creates optical errors.

A fourth disadvantage of the typical helmet is lack of ventilation. The helmet often becomes hot and uncomfortable after a period of wear.

A fifth disadvantage of the typical helmet is that the visor or optical elements may become fogged from condensation of the moisture contained in the wearer's breath. A fogged visor or other optical elements also interfere with the wearer's vision and impact safety and effectiveness.

SUMMARY OF THE INVENTION

This invention relates to the design of safety and display helmets in general and in particular the design of safety and display helmets for use in military aircraft. The helmet of the present invention improves the safety, comfort and effectiveness of flight crew personnel over that provided by the typical flight crew helmet.

According to one aspect of the invention, a volume of air is supplied to form a thin "cushion" of air between the wearer's head and the inner liner of the helmet. The helmet "floats" on this cushion of air and the weight of the helmet is thus distributed evenly on the wearer's head. The even distribution of the helmet weight eliminates the pressure points commonly found in typical helmets. These pressure points cause fatigue which negatively impact flight crew performance. The elimination of these pressure points in the helmet of the present invention, reduces fatigue and results in a corresponding improvement in flight crew safety and effectiveness.

According to another aspect of the invention, the volume of air is controlled by a regulator device and a relief valve. This regulator device controls the pressure of the air comprising the air cushion in response to the g force environment. The proper position of the helmet on the head can thus be maintained during aircraft maneuvers, preserving flight crew vision and comfort. The relief valve limits the air pressure to a designated value and prevents excess tension on the chin strap. This feature also enhances flight crew comfort and safety. A conventional pressure regulator, not responsive to g forces, may also be used.

According to another aspect of the invention, a valve selectable outlet device is provided to vent air over the helmet visor, thus demisting the visor, and ensuring clear vision.

According to yet another aspect of the invention, air may be allowed to rush past the wearer's head. The temperature of the air can be controlled by the wearer by means of a mixing valve upstream of the regulator. This feature prevents the helmet from becoming too hot and uncomfortable to wear, and also increases user comfort during operations in cold weather. The climate control features of the helmet of the present invention also positively influence human factors and improve flight crew performance and safety.

DETAILED DESCRIPTION OF THE PREFERRED EMBODIMENT

Figure 1:
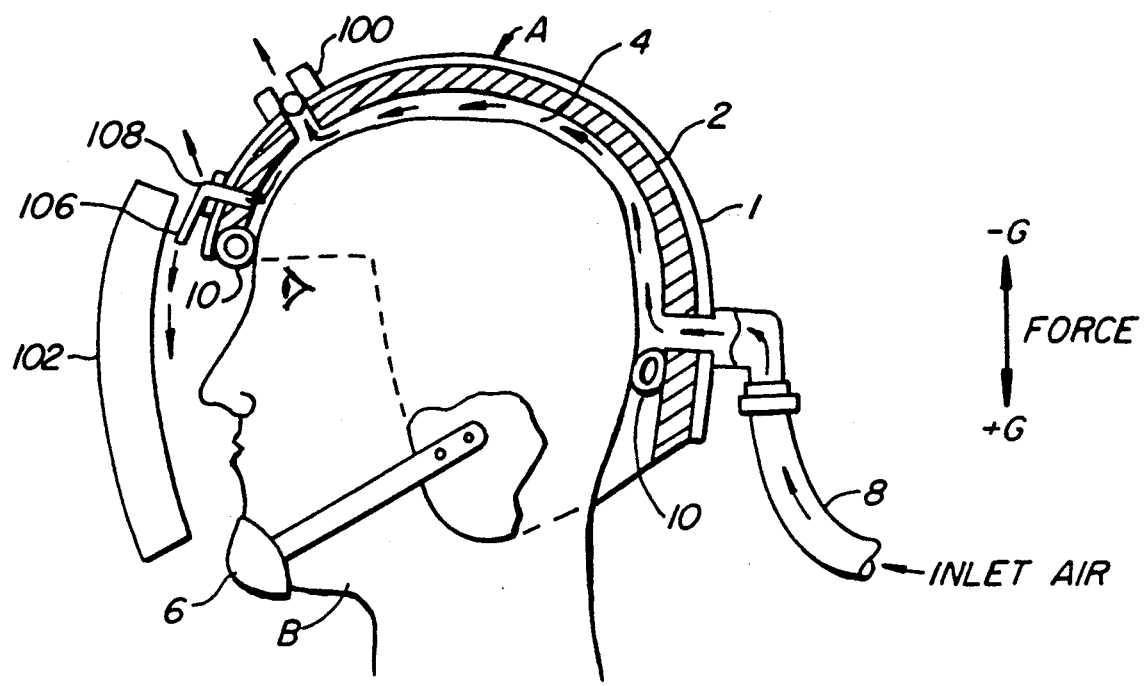
FIG. 1 is a drawing of one embodiment of the present invention.

The helmet structure of the present invention is shown, designated generally with the reference A, as comprising a helmet shell 1, lined with impact padding 2. See FIG. 1. A cushion of air 4 forms an interstitial cushion, between the user's head (B) and the helmet, that supports the weight of the helmet. The helmet is anchored to the head by the chin strap 6. Air cushion 4 distributes the helmet weight evenly over the wearer's head eliminating the pressure points of other helmets which rely on contact between impact padding and the wearer's head to support the helmet. The elimination of these pressure points increases wearer comfort allowing the helmet to be worn for a longer period of time. The nominal static pressure of the volume of air required to support the typical 4 pound helmet is approximately 0.20 pounds per square inch (1.4 kPa). The nominal pressure necessary to support the helmet can be adjusted for the user's comfort. Improvements in wearer comfort reduce fatigue and benefit flight crew safety and effectiveness.

The volume of air comprising air cushion 4 is supplied through inlet hose 8 and contained by seals 10. Inlet hose 8 would typically be connected to the engine bleed in military aircraft, but any source of compressed air can be used. Seal(s) 10, constructed from an O-ring type or flap type seal mounted proximate the periphery of the helmet shell 1, operates in the formation of the air cushion 4. This seal(s) is preferably fabricated from a compliant material for user comfort and sealing effectiveness. The seal(s) 10 also need not form a perfect seal as some minimal leakage is desired.

During flight and high speed maneuvers, flight crew members experience high g force loadings. Depending on the direction of the force, these g force loadings either compress the volume of air, and thus the helmet, against the user's head or alternately move the helmet away from the user's head creating excess tension on chin strap 6. Excessive tension on chin strap 6 is an additional source of wearer discomfort and may also impair the wearer's ability to communicate.

Minimizing the effect of the g forces on the helmet/user interface can be accomplished by regulating the pressure of air cushion 4 in response to the g loading. In a positive g force environment (the convention of which is illustrated in FIG. 1) the helmet is forced against the head. Increasing the air cushion pressure in response to this force will maintain the nominal space between the helmet and the head. In a negative g force environment, the helmet is forced away from the wearer's head. Decreasing the air cushion pressure, reduces the upward force component on the helmet provided by the air cushion and thus reduces tension on chin strap 6.

Thus, an air pressure regulator 12 is provided to control the air cushion 4 air pressure in response to the g force loadings. If regulator response to g forces is not required, then a conventional pressure regulator can be utilized.

Figure 2:
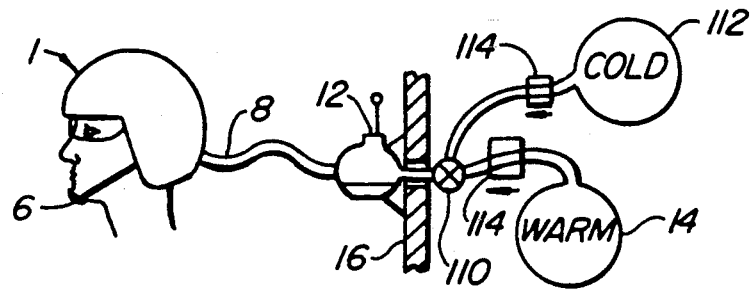
FIG. 2 is a drawing of one embodiment of the present invention shown connected to a pressure regulator device, an air supply, and air temperature control devices.

Air pressure regulator 12 is located between air supply 14 and the helmet. In the preferred embodiment, air pressure regulator 12 is secured to the airframe 16. See FIG. 2. Alternately, the air regulator may be located on the helmet.

Figure 3:
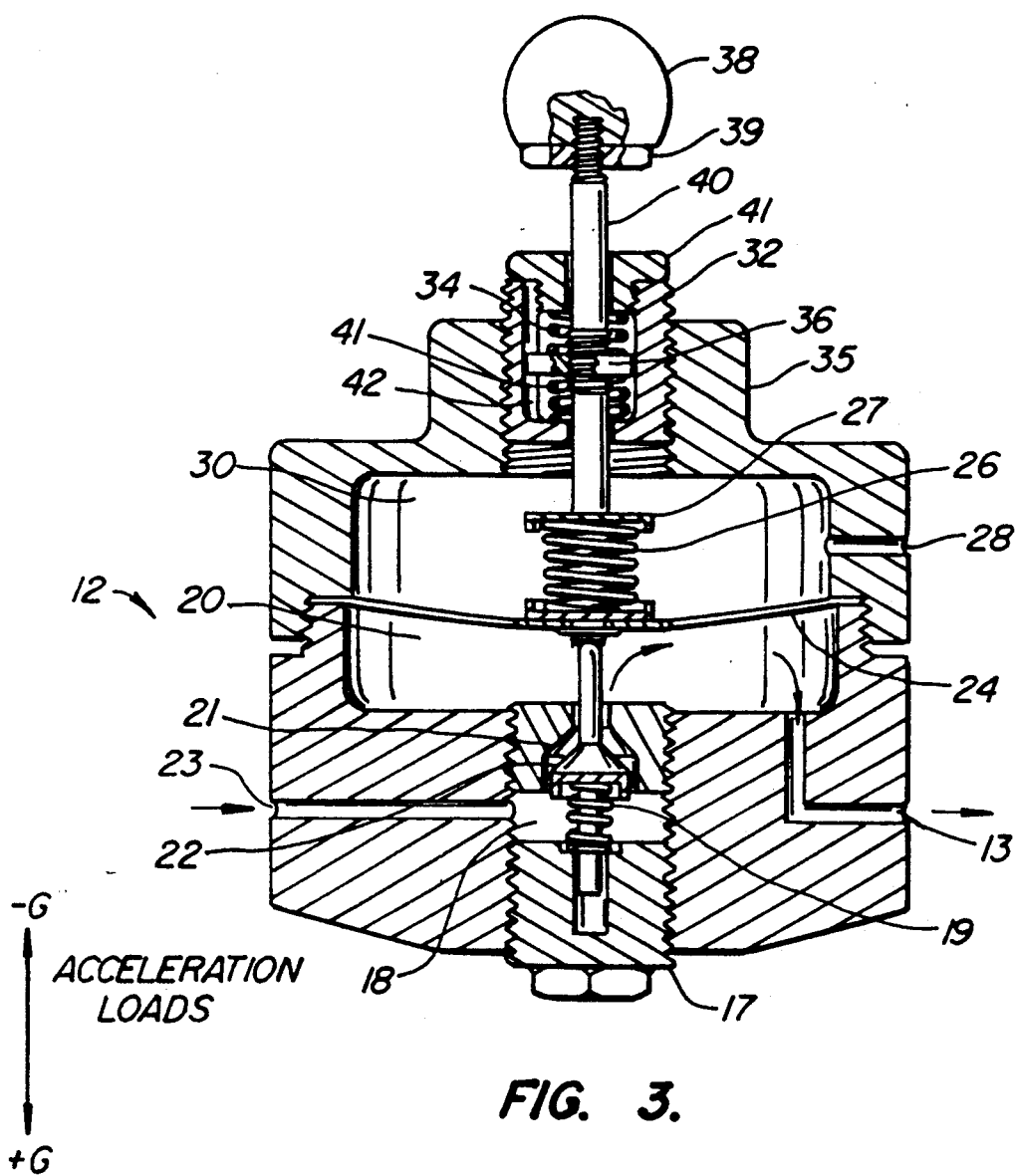
FIG. 3 is a drawing of a fluid regulator device according to an embodiment of the present invention.

FIG. 3 depicts the preferred embodiment of air pressure regulator 12. The operation of this device differs from operation of conventional air regulators to enable the device to respond to the g loadings experienced. In the pressure regulators of existing designs, high pressure air (or fluid) enters chamber 18 and is prevented from entering chamber 20 by closed valve 22. Diaphragm 24 is pre-loaded against valve 22 by spring 26 which is adjusted by rotation of a spring tension adjuster. Nominal pressure in chamber 20 offsets pre-load of spring 26 so that diaphragm 24 does not push down on valve 22. If pressure in chamber 20 falls below the nominal value, spring 26 moves diaphragm 24 down which opens valve 22, thus allowing air to flow from chamber 18 to chamber 20. When pressure in chamber 20 reaches the nominal value, diaphragm 24 moves up, thus allowing valve 22 to close. Vent 28 prevents movement of diaphragm 24 from changing pressure in chamber 30.

Figure 4:
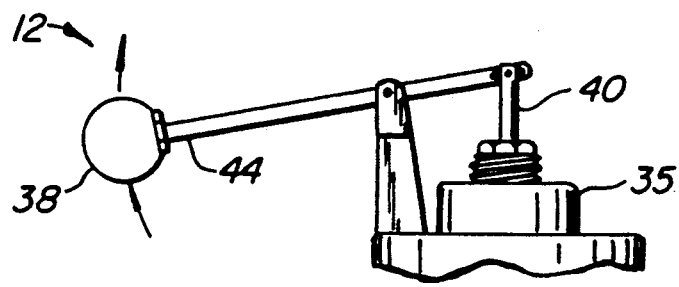
FIG. 4 is a drawing of a portion of a fluid regulator device according to the present invention.
Figure 5:
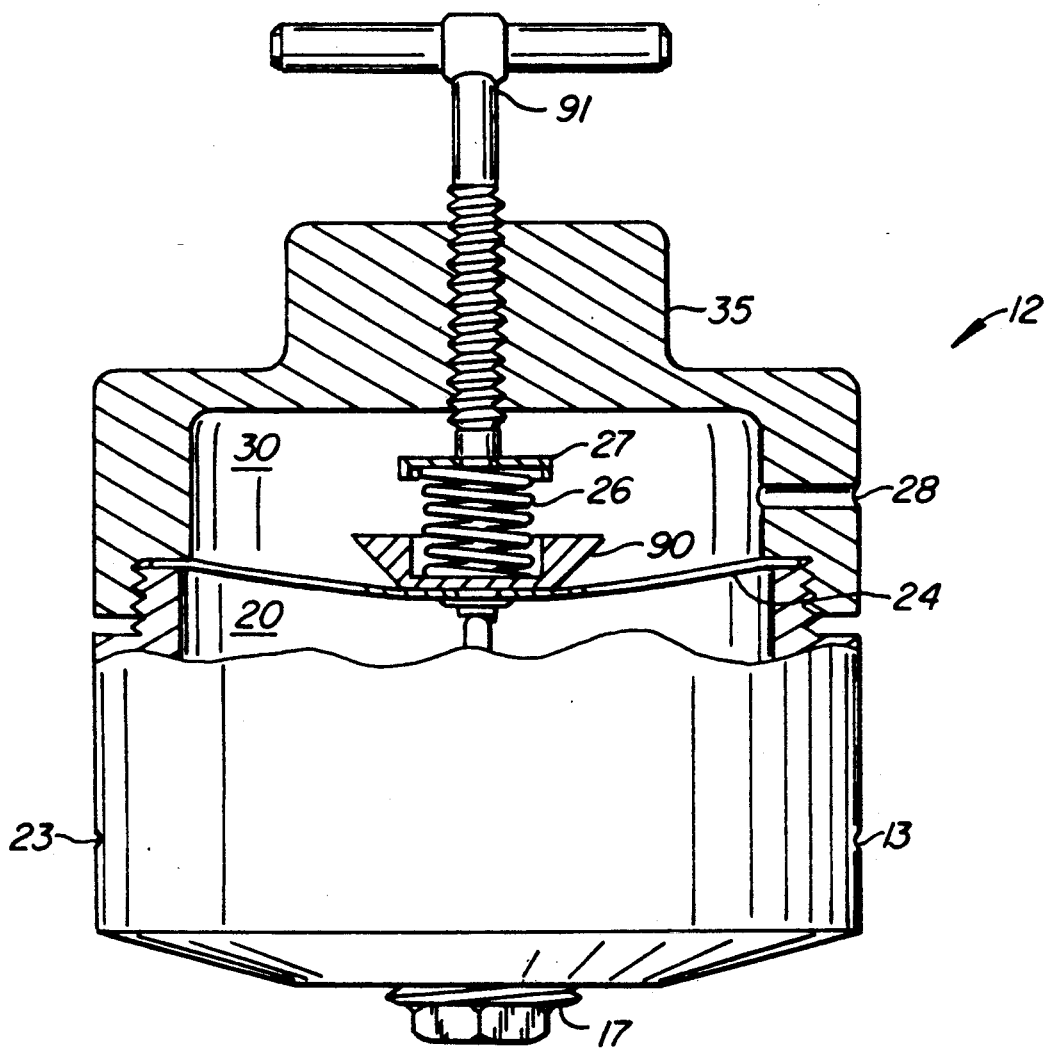
FIG. 5 is an alternate embodiment of a fluid regulator device.

In the pressure regulator of the present invention, pre-load of spring 26 is set by rotation of adjuster 32 and is transmitted to shaft 40 by means of springs 34 and 42 pressing against equalizer 36. Adjuster 32 permits the user to regulate the nominal pressure and response for user comfort. A "+g" acceleration load will cause weight 38 to move diaphragm 24 down, thus opening valve 22 and increasing pressure in chamber 20. A "−g" acceleration load will cause weight 38 to move up, allowing diaphragm 24 to move up by pressure in chamber 20, thus closing valve 22 and reducing pressure in chamber 20. Rotating threaded shaft 40 will drive threaded equalizer 36 up or down, thus compressing and loosening springs 34 and 41. This feature serves to "fine tune" the response of equalizer 36 and thus shaft 40 to g forces. The mass of weight 38, compression weights, spring lengths, spring rates, and area of diaphragm 24 all affect the operation of this regulator design. The weighted arm 44 shown in FIG. 4 will change the unit's sensitivity to g-forces and also the resulting force on shaft 40. Note that, with this configuration, the action on diaphragm 24 is reversed in respect to the direction of the g force. FIG. 5 shows a simplified version of this regulator, differing from the existing design only by the addition of weight 90 mounted directly to diaphragm 24.

The position of the regulator relative to the aircraft structure determines the axis in which the g loads will be sensed. Loads incurred along the two axes perpendicular to this axis are seldom encountered in flight and are not considered in this invention. However, regulator device 12 may be placed in any position to sense loads relative to that position and account for force loadings in the two perpendicular planes.

The pressure of air cushion 4 should not be allowed to exceed a certain nominal amount. Typically this amount will be in the neighborhood of 2 pounds per square inch (14 kPa). Air pressures in excess of this amount tend to push the helmet away from the user's head and create excess tension on chin strap 6. A relief valve 100, ensures that air pressure does not build up as a result of air regulator responses in excess of the nominal value of 2 psi. See FIG. 1. Relief valve 100 is of the ball and spring type in the preferred embodiment, but other suitable relief valves known to those skilled in the art can also be used.

The air regulator/relief valve combination preserves user comfort while ensuring that the helmet remains in a proper position on the user's head. As mentioned above, wearer comfort influences flight crew fatigue. Maintaining helmet position on the head also has important safety and mission effectiveness advantages. The typical helmet contains some form of optical element. Display helmets have their own unique optical elements. In a flight helmet, the optical element is often a visor 102. If the helmet shifts position, the wearer may be looking through a different portion of the visor. Optical errors can result which distort the crew member's vision and degrade the ability to read flight instruments, and acquire targets or points of reference. Thus, the air regulator/relief valve combination provides safety improvements over other helmets by reducing user fatigue and maintaining accurate vision.

The helmet of the present invention also assures accurate vision by using the volume of air contained in air cushion 4 to demist visor 102. The visor is an important safety feature in that it protects the eyes against the sun and foreign objects. However, the moisture content of the wearer's breath often fogs the visor, obscuring vision. If the condensation problem is persistent, the wearer will often lift the visor away from the face, negating the safety benefits of the visor entirely. Performance of display helmets may also be degraded by the presence of condensed vapor on the optical elements of those helmets. Air from air cushion 4 may be used to prevent fogging of the visor and other optical elements by directing it through outlet pipe 106. Three-way valve 108 controls the passage of air through the outlet pipe. In the first valve position, no air is released from the volume of air comprising air cushion 4 and the air is contained entirely within helmet/head interface. By selecting the appropriate position on three-way valve 108, the user can direct air to outlet pipe 106. With the appropriate position selected, air will rush out outlet pipe 106 and past visor 102 demisting the visor or other optical elements as required. Continued accurate vision is thus assured and the wearer is less likely to negate the safety features of the visor by lifting it away from the face.

Three-way valve 108 also enables another safety feature of the present invention. In the third position, air from air cushion 4 will be directed outside the helmet to provide a cooling or warming air flow past the wearer's head. A mixing valve 110, which receives both warm and cold air respectively from sources 112 and 14, is used to control the air temperature. One-way valves 114 prevent direct flow between sources 112 and 14. Wearing a flight helmet for an extended period often makes the wearer's head hot. Directing cool air past the head thus ventilates the wearer's head, increasing comfort and reducing fatigue. Alternately, during cold weather operations, the wearer may desire a flow of warm air past the head. Providing a flow of warm air to the head in cold temperatures not only increases user comfort but, aids in maintaining overall body temperature since the majority of heat loss occurs through the head.

Simultaneous operation of demisting and ventilation can be realized by intermediate positioning of valve 108 control.

The preferred embodiment of the present invention has thus been described. Other applications and embodiments of the invention will thus be readily apparent to those skilled in the art. For example, although the present invention was presented in the context of a flight safety and/or display helmet, the helmet may also be used in other high performance situations where protective headgear is required and a supply of air or other compressible fluid is available. One such application may be in race cars, race boats, etc. Furthermore, although air is likely to be the most convenient material with which to support the helmet, other compressible fluids can be employed. Likewise, the air source need not be the engine bleed, but may be a bottled supply or other compressor apparatus. For these reasons the scope of the invention should be construed in light of the claims.

What is claimed is:

1. A bladderless fluid cushion helmet comprising:
   attaching means for positioning and holding said helmet relative to a wearer's head;
   a sealing means, mounted proximate to and extending along a periphery of said helmet, for defining a volume between a wearer's head and an inner surface of said helmet;
   an inlet port, coupled to a fluid supply, wherein a compressible fluid is supplied through said inlet port to said volume, and wherein said helmet is supported by the compressible fluid contained in said volume; and
   a fluid pressure regulator disposed between said inlet port and said fluid supply to control a pressure of the fluid contained in said volume.

2. The bladderless fluid cushion helmet of claim 1 further comprising: a pressure relief valve to maintain the pressure of said compressible fluid contained in said volume below a given value.

3. The bladderless fluid cushion helmet of claim 1 wherein said compressible fluid is air.

4. The bladderless fluid cushion helmet of claim 1 wherein the attaching means includes a removably fastenable strap.

5. The bladderless fluid cushion helmet of claim 1 wherein said fluid pressure regulator further comprises:
   an inlet, coupled to said fluid supply, wherein said fluid is supplied through said inlet to a first chamber;
   a valve disposed between said first chamber and a second chamber to control a flow of fluid between said first and second chambers;
   an outlet coupled to said second chamber and to the inlet port of said helmet;
   a diaphragm disposed between said second chamber and a third chamber and coupled to a weight;
   a first shaft, having a first end coupled to said valve and a second end coupled to said diaphragm; and
   wherein said weight moves in response to an acceleration causing said diaphragm to move whereby said valve is opened and closed and wherein the pressure of the fluid exiting said outlet is regulated.

6. The bladderless fluid cushion helmet of claim 5 further comprising a spring which can be adjusted to control operation of said fluid pressure regulator.

7. The bladderless fluid cushion helmet of claim 1 wherein said sealing means comprises an O-ring.

8. A bladderless fluid cushion helmet comprising:
   attaching means for positioning and holding said helmet relative to a wearer's head;
   a sealing means, mounted proximate to and extending along a periphery of said helmet, for defining a volume between a wearer's head and an inner surface of said helmet;
   an inlet port, coupled to a fluid supply, wherein a compressible fluid is supplied through said inlet port to said volume, and wherein said helmet is supported by the compressible fluid contained in said volume;
   a fluid pressure regulator disposed between said inlet port and said fluid supply which controls a pressure of the fluid contained in said volume; and
   a valve, having at least two positions, coupled to an outlet port, wherein the fluid contained in said volume is directed through the outlet port when said valve is in an open position and substantially no fluid from said volume is directed through the outlet port when said valve is in a closed position.

9. The bladderless fluid cushion helmet of claim 8 wherein the fluid contained in said volume is directed through said outlet port to an optical element of said helmet when said valve is in a first open position and wherein said optical element is demisted.

10. The bladderless fluid cushion helmet of claim 8 wherein the fluid contained in said volume is directed through said outlet port past the wearer's head when said valve is in a second open position and wherein the wearer's head is ventilated.

11. The bladderless fluid cushion helmet of claim 8 further comprising a mixing value coupled to a supply of cold and warm fluid for regulating a temperature of said fluid introduced into said volume.

12. The bladderless fluid cushion helmet f of claim 8 wherein said compressible fluid is air.

13. The bladderless fluid cushion helmet of claim 8 further comprising:
   a pressure relief valve to maintain the pressure of said compressible fluid contained in said volume below a given value.

14. The bladderless fluid cushion helmet of claim 8, wherein the attaching means includes a removably fastenable strap.

15. The bladderless fluid cushion helmet of claim 8 wherein said fluid pressure regulator further comprises:
an inlet coupled to said fluid supply, wherein said fluid is supplied through said inlet port to a first chamber;
a valve disposed between said first chamber and a second chamber to control a flow of fluid between said first and second chambers;
an outlet coupled to said second chamber and to the inlet port of said helmet;
a diaphragm disposed between said second chamber and a third chamber and coupled to a weight;
a first shaft, having a first end coupled to said valve and a second end coupled to said diaphragm; and
wherein said weight moves in response to an acceleration causing said diaphragm to move whereby said valve is opened and closed and wherein the pressure of the fluid exiting said outlet is regulated.

16. The bladderless fluid cushion helmet of claim 15 further comprising a spring which can be adjusted to control operation of said fluid pressure regulator.

17. The bladderless fluid cushion helmet of claim 8 wherein the fluid in said volume is simultaneously directed through said outlet port to an optical element of said helmet and past the wearer's head when said valve is in an open position and wherein the optical element is demisted and the wearer's head is ventilated.

18. The bladderless fluid cushion helmet of claim 8 wherein said sealing means comprises an O-ring.

19. A fluid pressure regulator for regulating the fluid pressure of fluid contained in an apparatus comprising:
a housing;
a fluid inlet in said housing, wherein fluid is supplied to a first chamber of said fluid pressure regulator;
a valve disposed between said first chamber and a second chamber of said fluid pressure regulator to control a flow of fluid between said first and second chambers;
an outlet located in said housing and in fluid communication with said second chamber;
a diaphragm disposed between said second chamber and a third chamber and coupled to said valve;
an outlet pressure spring disposed within said third chamber and adjacent said diaphragm;
a threaded shaft, having a first end coupled to said outlet pressure spring and a second end exterior said housing, wherein said threaded shaft passes through said third chamber of said fluid pressure regulator;
a weight coupled to said threaded shaft; and
means, coupled to said threaded shaft, for adjusting said outlet pressure spring to control a nominal pressure of said second chamber by rotating said threaded shaft.

20. The fluid pressure regulator of claim 19 wherein said outlet is coupled to an inlet port of said apparatus.

21. The fluid pressure regulator of claim 19 wherein said apparatus comprises a helmet.

22. A fluid pressure regulator for regulating the fluid pressure of fluid contained in an apparatus comprising:
a housing;
a fluid inlet in said housing, wherein fluid is supplied to a first chamber of said fluid pressure regulator;
a valve disposed between said first chamber and a second chamber of said fluid pressure regulator to control a flow of fluid between said first and second chambers;
an outlet located in said housing and in fluid communication with said second chamber;
a diaphragm disposed between said second chamber and a third chamber and coupled to said valve to control a position of said valve;
an outlet pressure spring disposed within said third chamber and adjacent said diaphragm;
a threaded shaft, having a first end coupled to said outlet pressure spring and a second end exterior said housing, wherein said threaded shaft passes through said third chamber of said fluid pressure regulator;
a weight coupled to said threaded shaft, wherein said weight, in response to an acceleration, causes a motion of said threaded shaft whereby said diaphragm operates to position said valve; and
means for controlling said motion of said threaded shaft to adjust a responsiveness of said fluid pressure regulator to said acceleration, having:
(i) a first outlet pressure adjuster spring, disposed on said threaded shaft;
(ii) a second outlet pressure adjuster spring, disposed on said threaded shaft; and
(iii) an equalizer disposed between said first and second outlet pressure adjuster springs to compress and loosen said first and second outlet pressure adjuster springs in response to rotation of said threaded shaft.

23. The fluid pressure regulator of claim 22 wherein said apparatus comprises a helmet.

24. The fluid pressure regulator of claim 22 wherein said outlet is coupled to an inlet port of said apparatus.

* * * * *

UNITED STATES PATENT AND TRADEMARK OFFICE
CERTIFICATE OF CORRECTION

PATENT NO. : 5,050,240

DATED : 9/24/91

INVENTOR(S) : James L. Sayre

It is certified that error appears in the above-identified patent and that said Letters Patent is hereby corrected as shown below:

Col. 3, line 1, "0-ring" (number) should be --O-ring-- (letter).

Col. 6, line 63 "f" after "helmet" should be deleted.

Signed and Sealed this

Twenty-third Day of February, 1993

*Attest:*

STEPHEN G. KUNIN

*Attesting Officer*     *Acting Commissioner of Patents and Trademarks*